United States Patent
Ueno et al.

(10) Patent No.: US 12,465,314 B2
(45) Date of Patent: Nov. 11, 2025

(54) RADIATION IMAGING APPARATUS, RADIATION IMAGING SYSTEM, CONTROL METHOD, AND STORAGE MEDIUM

(71) Applicant: CANON KABUSHIKI KAISHA, Tokyo (JP)

(72) Inventors: Hiroto Ueno, Kanagawa (JP); Mina Takeshima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 198 days.

(21) Appl. No.: 18/051,402

(22) Filed: Oct. 31, 2022

(65) Prior Publication Data

US 2023/0138148 A1     May 4, 2023

(30) Foreign Application Priority Data

Nov. 4, 2021 (JP) ................... 2021-180577
Apr. 14, 2022 (JP) ................... 2022-067120
Oct. 21, 2022 (JP) ................... 2022-169169

(51) Int. Cl.
    *A61B 6/00*      (2024.01)

(52) U.S. Cl.
    CPC ................... *A61B 6/542* (2013.01)

(58) Field of Classification Search
    CPC .............. A61B 6/542; A61B 6/56; A61B 6/40
    See application file for complete search history.

(56) References Cited

U.S. PATENT DOCUMENTS

| | | | | |
|---|---|---|---|---|
| 2012/0065994 A1* | 3/2012 | Carter | ............... | G16H 10/60 705/3 |
| 2013/0089176 A1* | 4/2013 | Nabatame | ............ | A61B 6/032 378/4 |
| 2013/0136234 A1* | 5/2013 | Noma | .................. | A61B 6/548 378/91 |

(Continued)

FOREIGN PATENT DOCUMENTS

| | | |
|---|---|---|
| EP | 1 990 005 A1 | 11/2008 |
| EP | 2 601 891 A1 | 6/2013 |

(Continued)

*Primary Examiner* — David P Porta
*Assistant Examiner* — Mamadou Faye
(74) *Attorney, Agent, or Firm* — Canon U.S.A., Inc. IP Division (57) ABSTRACT

Provided is a mechanism for enabling a radiation generation apparatus to accurately perform control processing to stop irradiation of radiation. The mechanism includes a dose calculation unit that calculates a cumulative dose of radiation detected by a sensor unit from start of imaging, a timer unit that measures an irradiation time for radiation from a predetermined timing, a threshold decision unit that sets an irradiation stop threshold based on the irradiation time, a control unit including a threshold determination unit that transmits an irradiation stop signal to stop irradiation of radiation to the radiation generation apparatus when the cumulative dose reaches the irradiation stop threshold, and a sensor unit that detects radiation from the radiation generation apparatus. When the dose calculation unit calculates the cumulative dose having reached a predetermined amount (Continued)

from start of imaging, the threshold determination unit causes the timer unit to start measurement of the irradiation time.

16 Claims, 5 Drawing Sheets

(56) References Cited

U.S. PATENT DOCUMENTS

| | | | |
|---|---|---|---|
| 2015/0055752 A1* | 2/2015 | Takahashi | H04N 5/32 |
| | | | 378/91 |
| 2015/0230763 A1* | 8/2015 | Nagai | A61B 6/08 |
| | | | 378/42 |
| 2018/0353150 A1* | 12/2018 | Takeshima | A61B 6/56 |
| 2020/0155108 A1* | 5/2020 | Saigusa | A61B 6/4283 |
| 2021/0393981 A1* | 12/2021 | Folkerts | G16H 20/40 |

FOREIGN PATENT DOCUMENTS

| | | |
|---|---|---|
| JP | 2013138829 A | 7/2013 |
| JP | 2013244166 A | 12/2013 |
| JP | 2021137271 A | 9/2021 |
| WO | 2013176251 A1 | 11/2013 |

\* cited by examiner

TABLE 4A

| COMMUNICATION MODE | COMMUNICATION DELAY TIME Tdc |
|---|---|
| WIRED | A [us] |
| WIRELESS ANTENNA 0 | B [us] |
| WIRELESS ANTENNA 1 | C [us] |
| WIRELESS ANTENNA 0+1 | D [us] |

TABLE 4B

| COMMUNICATION MODE | DIFFERENCE FROM COMMUNICATION DELAY TIME Tdc |
|---|---|
| WIRED | -aaa [us] |
| WIRELESS ANTENNA 0 | +bbb [us] |
| WIRELESS ANTENNA 1 | +ccc [us] |
| WIRELESS ANTENNA 0+1 | +ddd [us] |

FIG.5

RADIATION IMAGING APPARATUS, RADIATION IMAGING SYSTEM, CONTROL METHOD, AND STORAGE MEDIUM

BACKGROUND OF THE INVENTION

Field of the Invention

The present invention relates to a radiation imaging apparatus, a radiation imaging system, a control method, and a storage medium.

Description of the Related Art

As a radiation imaging apparatus for use in medical diagnostic imaging and nondestructive inspection with radiation, such as X-rays, a radiation imaging apparatus including a flat panel detector (FPD) formed of a semiconductor material is currently in widespread use. For example, in medical diagnostic imaging, such a radiation imaging apparatus is used as a digital radiation imaging apparatus to perform still image capturing such as general image capturing and moving image capturing such as fluoroscopic image capturing.

Some radiation imaging apparatuses are configured to monitor the irradiation dose (cumulative dose) of radiation and stop irradiation of radiation (e.g., transmit an irradiation stop signal for stopping irradiation of radiation to the radiation generation apparatus) in a case where the cumulative dose reaches a threshold. This operation is referred to as automatic exposure control (AEC). The AEC can prevent, for example, excessive radiation irradiation.

As an example of such a radiation imaging apparatus, Japanese Patent Application Laid-Open No. 2013-138829 discusses a radiation imaging apparatus including a dose detection unit that is provided in an imaging region of an FPD and is configured to detect the dose of radiation that reaches the imaging region. In the radiation imaging apparatus discussed in Japanese Patent Application Laid-Open No. 2013-138829, a timing for stopping irradiation of radiation in the radiation imaging apparatus is predicted based on the dose detected by the dose detection unit and a preset dose target value. Additionally, an irradiation stop timing notification for notifying the radiation generation apparatus of the timing for stopping irradiation of radiation is issued before the irradiation stop timing is reached.

However, in the technique discussed in Japanese Patent Application Laid-Open No. 2013-138829, the radiation generation apparatus cannot accurately perform control processing to stop irradiation of radiation. Specifically, in the technique discussed in Japanese Patent Application Laid-Open No. 2013-138829, if the dose rate of radiation that is transmitted through an object is high, the cumulative dose of radiation reaches the threshold in a short period of time, for example, about several milliseconds (ms). This may cause an issue that the cumulative dose of radiation exceeds the threshold before the irradiation stop timing notification is made to cause the radiation generation apparatus to stop irradiation of radiation.

SUMMARY OF THE INVENTION

The present invention has been made in view of the above-described issue, and is directed to providing a mechanism for enabling a radiation generation apparatus to accurately perform control processing to stop irradiation of radiation.

The above-described issue is solved by a radiation imaging apparatus includes a sensor unit configured to detect radiation from a radiation generation apparatus, and a control unit configured to transmit a signal for stopping irradiation of radiation to the radiation generation apparatus using a cumulative dose of the radiation detected by the sensor unit, an irradiation time for the radiation, and an irradiation stop threshold, wherein the control unit measures the irradiation time based on the cumulative dose.

Further features of the present invention will become apparent from the following description of exemplary embodiments with reference to the attached drawings.

DESCRIPTION OF THE EMBODIMENTS

Exemplary embodiments of the present invention will be described below with reference to the drawings. Assume herein that X-rays can be suitably used as radiation according to the present invention. However, the radiation is not limited only to X-rays. Examples of the radiation may also include α-rays, β-rays, and γ-rays.

Figure 1:
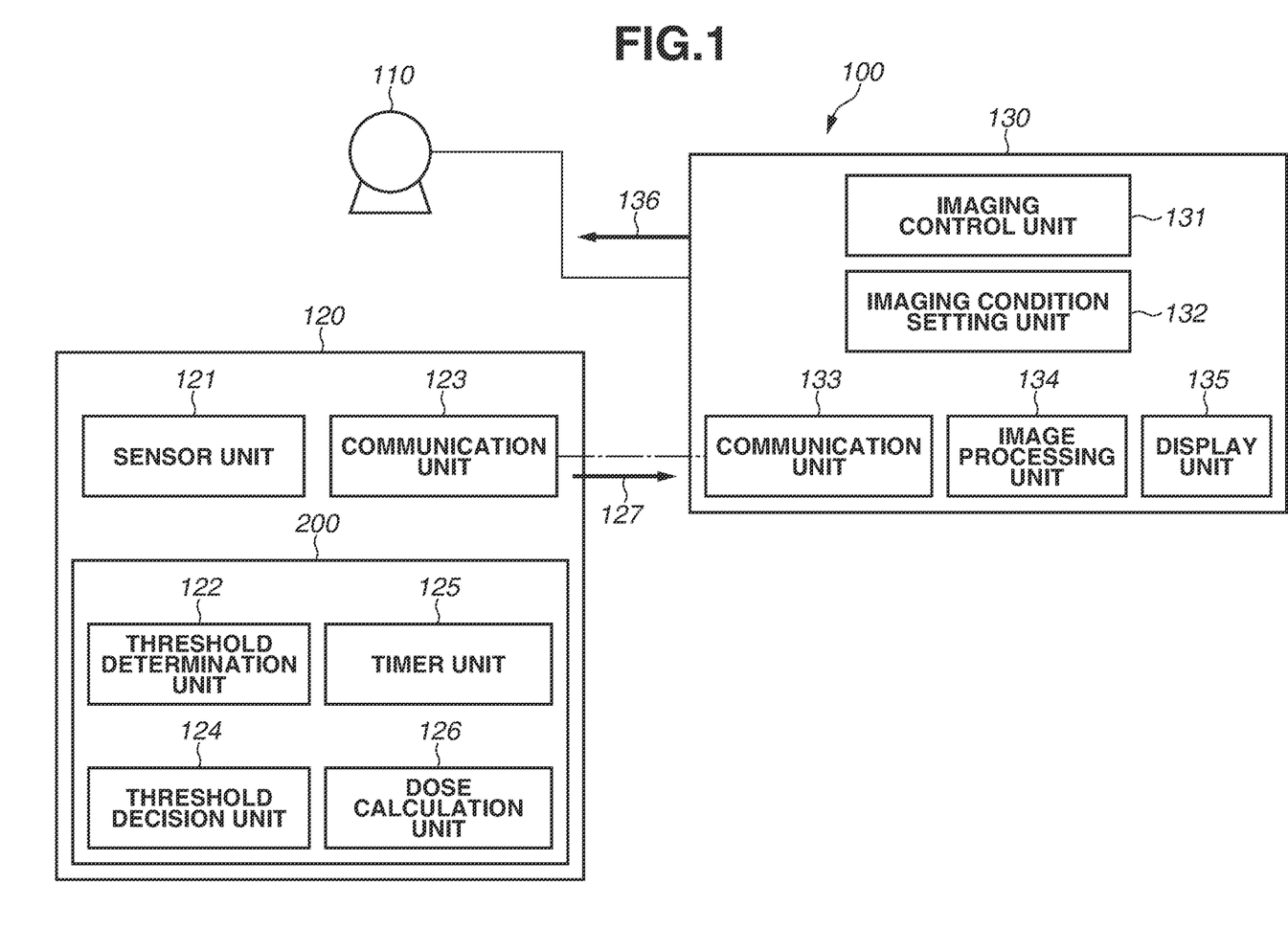
FIG. 1 is a block diagram illustrating a schematic configuration example of a radiation imaging system according to a first exemplary embodiment.

FIG. 1 is a block diagram illustrating a schematic configuration example of a radiation imaging system 100 according to a first exemplary embodiment of the present invention. In the first exemplary embodiment, the radiation imaging system 100 can be suitably used for medical use. As illustrated in FIG. 1, the radiation imaging system 100 includes a radiation generation apparatus 110, a radiation imaging apparatus 120, and an irradiation control apparatus 130.

The radiation generation apparatus 110 emits radiation to an object (not illustrated) based on control processing performed by the irradiation control apparatus 130 (specifically, an imaging control unit 131). The radiation generation apparatus 110 includes a radiation tube serving as a radiation generation unit to generate radiation, and a collimator for defining the beam spread angle of the radiation generated by the radiation tube.

The radiation imaging apparatus 120 includes a flat panel detector (FPD), for example, and also includes a sensor unit 121 including two-dimensionally distributed image sensors. The sensor unit 121 is configured to detect the radiation that is emitted from the radiation generation apparatus 110 and enters the sensor unit 121.

Specifically, the radiation imaging apparatus 120 detects information (dose information) about a two-dimensional distribution of doses of radiation that reaches the image sensors in the sensor unit 121, and generates radiation image data. After that, the radiation imaging apparatus 120 transmits the generated radiation image data to an image processing unit 134 of the irradiation control apparatus 130 through a communication unit 123. The irradiation control apparatus 130 controls operations of the radiation generation apparatus 110 and the radiation imaging apparatus 120, and acquires and processes radiation image data generated by the radiation imaging apparatus 120.

The radiation imaging apparatus 120 also includes a control unit 200. The control unit 200 includes a threshold determination unit 122, a threshold decision unit 124, a timer unit 125, and a dose calculation unit 126. The threshold determination unit 122 includes a function for determining whether the dose detected by the sensor unit 121 has reached a threshold. If the threshold determination unit 122 determines that the radiation dose (cumulative dose) that is detected by the sensor unit 121 and is calculated by the dose calculation unit 126 has reached a predetermined irradiation stop threshold, the threshold determination unit 122 transmits an irradiation stop signal 127 to the irradiation control apparatus 130 through the communication unit 123. When the irradiation control apparatus 130 receives the irradiation stop signal 127 from the radiation imaging apparatus 120 through a communication unit 133, the imaging control unit 131 performs an irradiation stop control 136 to stop irradiation of radiation from the radiation generation apparatus 110.

At the same time, the communication unit 133 returns a response indicating receipt of the irradiation stop signal 127 to the radiation imaging apparatus 120. If the radiation imaging apparatus 120 cannot receive a response for a certain period of time after the irradiation stop signal 127 is transmitted, the radiation imaging apparatus 120 retransmits the irradiation stop signal 127 to the irradiation control apparatus 130.

When the dose calculation unit 126 calculates the cumulative dose that has reached a predetermined amount from start of imaging, the threshold determination unit 122 determines that the irradiation has been started and causes the timer unit 125 to start measurement of an irradiation time. In this case, a threshold for the dose is referred to as an irradiation start threshold. In a case where the dose detected by the sensor unit 121 has reached the irradiation start threshold, the threshold determination unit 122 transmits information indicating that the dose has reached the irradiation start threshold to the threshold decision unit 124. Upon receiving, from the threshold determination unit 122, the information indicating that the dose has reached the irradiation start threshold, the threshold decision unit 124 sets the time point when the dose reaches the irradiation start threshold as a threshold change reference point. The predetermined amount corresponding to the irradiation start threshold is a dose value as a reference with which it is determined that the irradiation of radiation from the radiation generation apparatus 110 starts to be stabilized. A suitable value is set to the threshold determination unit 122 according to the properties of the radiation generation apparatus 110.

The timer unit 125 is a timer for measuring the irradiation time for radiation from a predetermined timing. In the present exemplary embodiment, the irradiation time is measured from the threshold change reference point set by the threshold decision unit 124. The threshold decision unit 124 successively changes a timing of transmission of the irradiation stop signal 127 based on a time variation from the threshold change reference point, the irradiation start threshold, and a communication delay time Tdc to be described below, with reference to the irradiation time measured by the timer unit 125 and the irradiation start threshold of the threshold determination unit 122.

The communication unit 123 is configured to communicate with the irradiation control apparatus 130 by wired communication and wireless communication. Prior to imaging, the communication unit 123 communicates with the communication unit 133 of the irradiation control apparatus 130 and the timer unit 125 measures a communication response time between the radiation imaging apparatus 120 and the irradiation control apparatus 130, to thereby calculate the communication delay time Tdc. The communication delay time Tdc is held in the threshold decision unit 124. The threshold decision unit 124 reflects the calculated communication delay time Tdc in the setting of the irradiation stop threshold.

Assume herein that the communication delay time Tdc is held in a table format or the like in the threshold decision unit 124 so that a number of communication delay times Tdc corresponding to the number of combinations of communication modes between the communication unit 123 and the communication unit 133 can be held. The communication delay time Tdc to be reflected in the setting of the irradiation stop threshold by the threshold decision unit 124 is switched depending on the communication mode between the communication unit 123 and the communication unit 133. Instead of holding the communication delay time Tdc in a table format, the communication delay time Tdc may be calculated based on a formula, or may be calculated by measurements.

Next, the functions of the imaging control unit 131, an imaging condition setting unit 132, the communication unit 133, the image processing unit 134, and a display unit 135 included in the irradiation control apparatus 130 will be described.

The imaging condition setting unit 132 sets imaging condition data including imaging condition information about, for example, an object imaging area, a tube voltage and a tube current in the radiation generation apparatus 110, and a target value Dref of the dose (cumulative dose) of radiation that is transmitted through the object and reaches the radiation imaging apparatus 120. The term "dose" used herein generally refers to the cumulative dose of radiation during irradiation of radiation. A dose value similar to the dose and a dose value linked to the dose can also be used, and these values are hereinafter referred to as "cumulative dose", as needed.

The communication unit 133 is configured to communicate with the radiation imaging apparatus 120 by wired communication and wireless communication.

The image processing unit 134 performs image processing, such as gradation processing and noise reduction processing, on the radiation image data transmitted from the radiation imaging apparatus 120. The image processing unit 134 transmits the radiation image data subjected to the image processing to the display unit 135.

The display unit 135 outputs a radiation image based on the radiation image data transmitted from the image processing unit 134 to a monitor or the like and displays the radiation image.

In the radiation imaging system 100 according to the present exemplary embodiment, a timing for transmitting the irradiation stop signal 127 from the radiation imaging apparatus 120 to the irradiation control apparatus 130 is based on a period of time for transmitting the irradiation stop signal 127 from the above-described radiation imaging apparatus 120 to the irradiation control apparatus 130. Further, it may be desirable to set the timing by taking into consideration a delay time from a time when the irradiation control apparatus 130 performs the irradiation stop control 136 to stop irradiation of radiation from the radiation generation apparatus 110 to a time when irradiation of radiation is stopped in the radiation generation apparatus 110.

The time when irradiation of radiation is stopped in the radiation generation apparatus 110 corresponds to the time when the tube voltage in the radiation tube of the radiation generation apparatus 110 has started to drop or the tube voltage has dropped to a minimum voltage level. In the case of setting the delay time based on the time when the tube voltage has dropped to the minimum voltage level, it may be desirable to set the delay time by adding a period of time obtained by multiplying a coefficient set in consideration of change in the dose and quality of radiation by a non-stationary period from a time when the tube voltage in the radiation tube has started to drop to a time when the tube voltage has dropped to the minimum voltage level.

More specifically, a delay time Td is divided into two periods, i.e., a stationary period Ta and a non-stationary period Tb. The stationary period Ta is a period from a time when a signal is transmitted to a time when the tube voltage has started to drop. The non-stationary period Tb is a period from a time when the tube voltage has started to drop to a time when the tube voltage has dropped to the minimum voltage level. In this case, since the tube voltage in the radiation tube drops in the non-stationary period Tb, the delay time Td is obtained by multiplying a coefficient k (k is less than or equal to "1") and adding the multiplication result. That is, the delay time Td to which the non-stationary period Tb is added can be determined based on the following expression.

$$Td = Ta + kTb$$

In the present exemplary embodiment, it may be desirable to acquire the delay time Td before irradiation of radiation in object radiation imaging (before imaging) for each radiation generation apparatus. A value obtained by actual measurements when the radiation imaging apparatus 120 is installed can be used as the delay time Td. Alternatively, an imaging environment and the radiation generation apparatus 110 to be used may be preliminarily registered in a database and the delay time Td may be calculated with reference to the database. It may be desirable to provide a notification about the delay time Td in advance to the threshold decision unit 124 and to set the irradiation stop threshold in consideration of the delay time Td.

Next, object imaging processing will be described with reference to FIG. 2.

Figure 2:
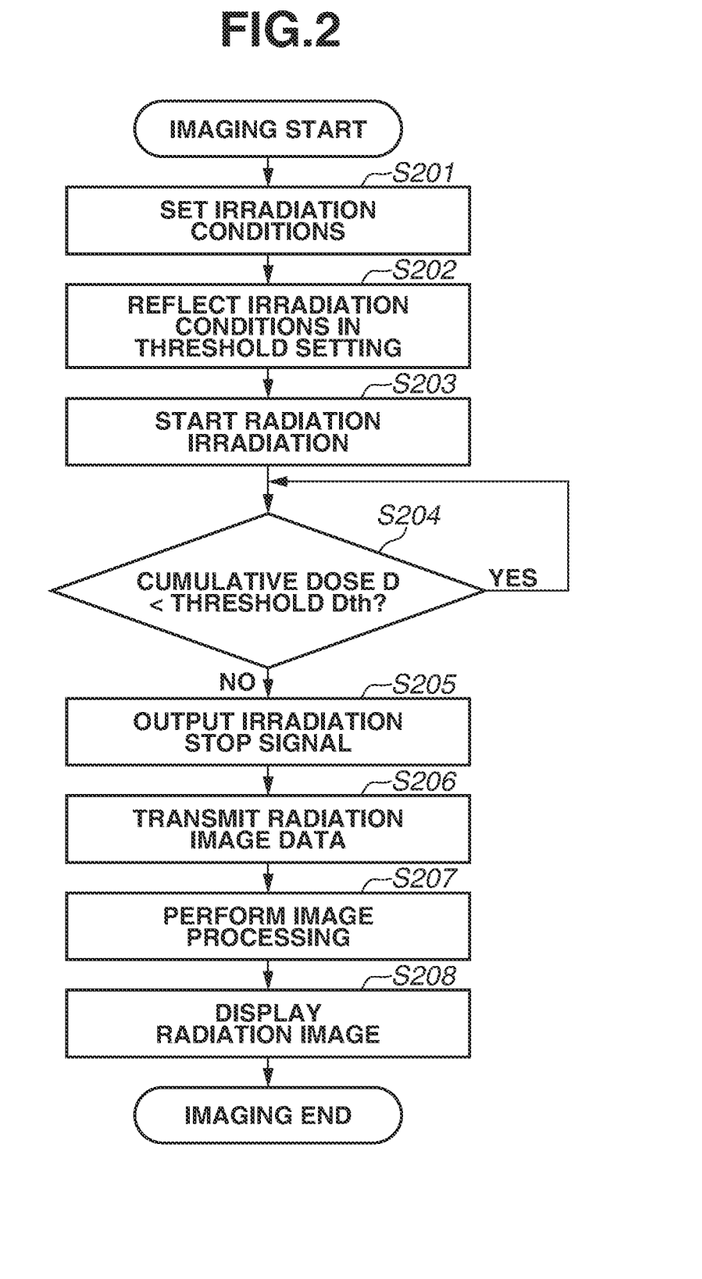
FIG. 2 is a flowchart illustrating an example of a processing procedure for a series of control methods from start of imaging of an object to end of imaging in the radiation imaging system according to the first exemplary embodiment.

FIG. 2 is a flowchart illustrating an example of a processing procedure in a series of control methods from start of imaging of an object to end of imaging in the radiation imaging system 100 according to the first exemplary embodiment.

In this imaging processing, object radiation imaging is performed by setting an irradiation stop threshold Dth for the dose (cumulative dose) and a time variation of the irradiation stop threshold Dth based on the preliminarily held delay time Td, the preliminarily acquired communication delay time Tdc, the irradiation start threshold Dobs, and the target value Dref of the dose (cumulative dose).

First, in step S201, the imaging condition setting unit 132 receives an imaging start instruction input by an operator through an input unit (not illustrated), and sets, for example, imaging condition information (irradiation condition information) input by the operator. In this case, the imaging condition setting unit 132 sets the tube voltage and tube current in the radiation tube, the target value Dref of the dose (cumulative dose), the irradiation start threshold Dobs, the delay time Td, and the like as the imaging condition information (irradiation condition information).

After that, the imaging condition setting unit 132 transmits the acquired imaging start instruction and the set imaging condition information (irradiation condition information) to the radiation imaging apparatus 120. The value of the delay time Td may be stored in any one of the apparatuses constituting the radiation imaging system 100, and the stored value may be referenced.

Next, in step S202, the threshold decision unit 124 sets the irradiation stop threshold Dth for the dose (cumulative dose) and the time variation of the irradiation stop threshold Dth based on the target value Dref of the dose (cumulative dose), the irradiation start threshold Dobs, the delay time Td, and the communication delay time Tdc set in step S201. Settings of the irradiation stop threshold Dth for the dose (cumulative dose) and the time variation of the irradiation stop threshold Dth will be described below with reference to FIG. 5.

Next, in step S203, the imaging control unit 131 transmits an irradiation execution signal for executing irradiation of radiation, as well as the imaging condition information (irradiation condition information) received from the imaging condition setting unit 132 in step S201, to the radiation generation apparatus 110. In response to this, the radiation generation apparatus 110 irradiates the object with radiation under irradiation conditions based on the imaging condition information (irradiation condition information) received from the imaging condition setting unit 132.

Next, in step S204, the dose calculation unit 126 first calculates a value D that is representative of the dose (cumulative dose) of radiation detected by the sensor unit 121. In this case, a maximum value, an average value, a median, or the like of the doses (cumulative doses) may be used as the value D that is representative of the dose (cumulative dose) of radiation. The value D that is representative of the dose (cumulative dose) of radiation is hereinafter referred to as the "radiation dose (cumulative dose) D".

The threshold determination unit 122 compares the radiation dose (cumulative dose) D with the irradiation stop threshold Dth set in step S202 to determine whether the radiation dose (cumulative dose) D is less than the irradiation stop threshold Dth. As a result of this determination, if the radiation dose (cumulative dose) D is less than the irradiation stop threshold Dth (YES in step S204), the processing of step S204 is repeated.

On the other hand, as a result of determination in step S204, if the radiation dose (cumulative dose) D is more than or equal to the irradiation stop threshold Dth (radiation dose (cumulative dose) D is more than or equal to the threshold) (NO in step S204), the processing proceeds to step S205.

In step S205, since the radiation dose (cumulative dose) D has reached the irradiation stop threshold Dth, the radiation imaging apparatus 120 transmits the irradiation stop signal 127 for stopping irradiation of radiation from the radiation generation apparatus 110 to the irradiation control apparatus 130. Upon receiving the irradiation stop signal 127, the irradiation control apparatus 130 causes the imaging control unit 131 to perform the irradiation stop control 136 on the radiation generation apparatus 110.

In this case, the radiation is continuously irradiated by the amount corresponding to the communication delay time Tdc associated with the transmission of the irradiation stop signal 127 and the delay time Td from the time when the irradiation stop control 136 is performed to the time when irradiation of radiation is actually stopped in the radiation generation apparatus 110. This makes it possible to set the actual radiation dose (cumulative dose) D to be approximate to the target value Dref of the dose (cumulative dose).

Next, in step S206, the radiation imaging apparatus 120 controls the image sensors in the sensor unit 121 to stop conversion into dose information, and transmits the generated radiation image data to the image processing unit 134.

Next, in step S207, the image processing unit 134 performs image processing, such as gradation processing and noise reduction processing, on the radiation image data received from the radiation imaging apparatus 120. After that, the image processing unit 134 transmits the radiation image data subjected to the image processing to the display unit 135.

Next, in step S208, the display unit 135 outputs a radiation image based on the radiation image data received from the image processing unit 134 to the monitor or the like and displays the radiation image to thereby present the radiation image to the operator.

After completion of the processing of step S208, the processing in the flowchart for object radiation imaging illustrated in FIG. 2 is terminated.

Figure 3:
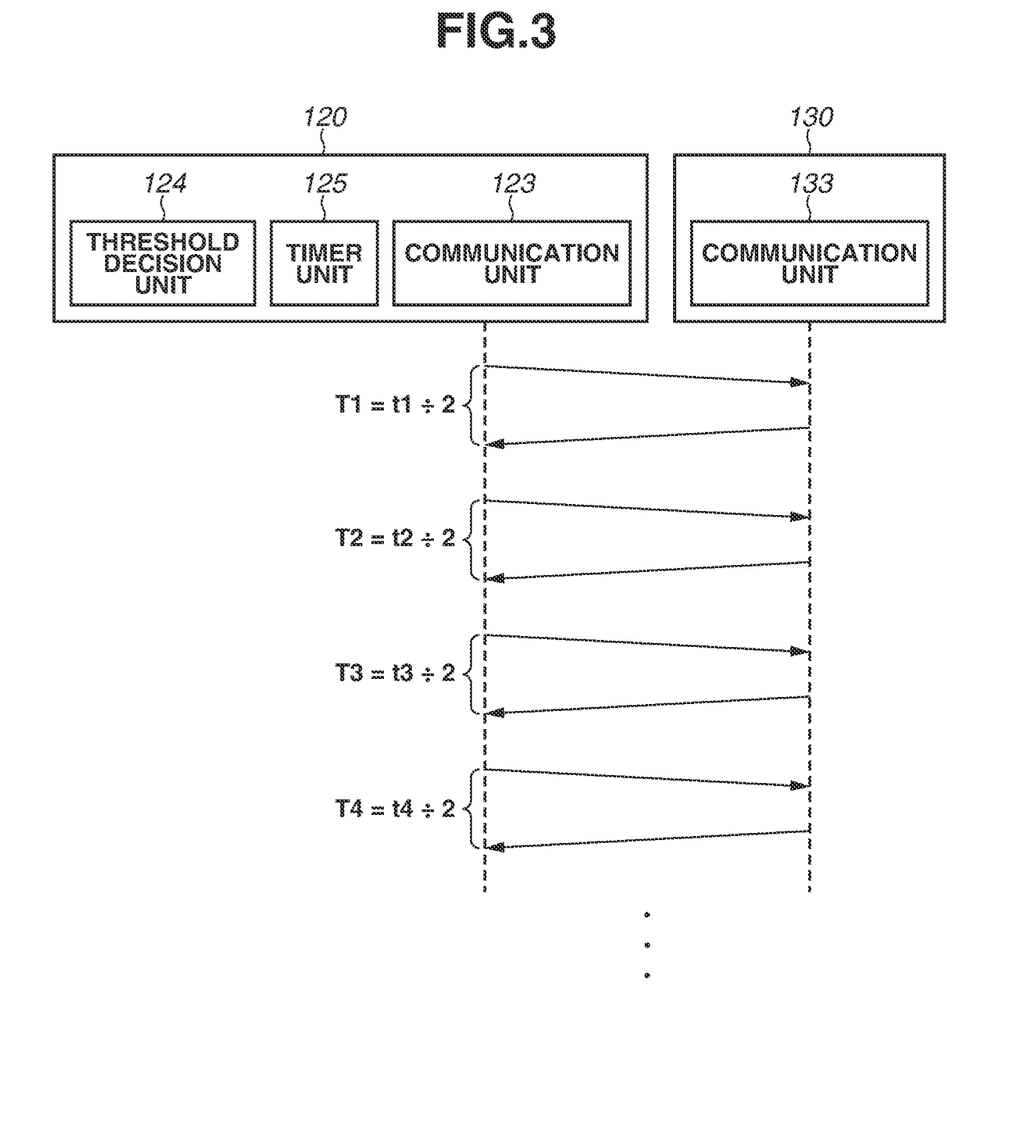
FIG. 3 illustrates an example of a processing procedure for a series of control methods for measuring a communication delay time in the radiation imaging system according to the first exemplary embodiment.

Next, a method for acquiring the communication delay time Tdc before imaging will be described with reference to FIG. 3.

In a state where the radiation imaging apparatus 120 and the irradiation control apparatus 130 are activated and are ready to communicate with each other by wired communication or wireless communication, the radiation imaging apparatus 120 causes the communication unit 123 to sends an inquiry about acquiring the communication delay time Tdc to the communication unit 133 of the irradiation control apparatus 130.

In this case, the radiation imaging apparatus 120 refers to a counter of the timer unit 125. The irradiation control apparatus 130 sends a response immediately after receiving the inquiry about the communication delay time Tdc. Upon receiving the response from the irradiation control apparatus 130, the radiation imaging apparatus 120 refers to the counter of the timer unit 125 and holds a period of time obtained by calculating a round-trip communication time (t1)÷2 as a temporary communication delay time (T1).

The radiation imaging apparatus 120 repeatedly and continuously performs this operation before imaging is started, to thereby acquire a plurality of temporary communication delay times (T2, T3, T4, and • • •). If the number of acquired temporary communication delay times exceeds a maximum number, the oldest information is overwritten, as needed, with new information. At an imaging start timing, a single communication delay time is calculated based on the plurality of acquired temporary communication delay times, and the calculated communication delay time is set as the communication delay time Tdc. In this case, a single communication delay time may be calculated using an average value (e.g. median, mean, mode, etc.) of some or all of the plurality of communication delay times, or may be calculated using a minimum value of some or all of the plurality of communication delay times.

The threshold decision unit 124 uses the communication delay time Tdc to set the irradiation stop threshold Dth for the dose (cumulative dose) and the time variation of the irradiation stop threshold Dth for the target value Dref of the dose (cumulative dose). Settings of the irradiation stop threshold Dth for the dose (cumulative dose) and the time variation of the irradiation stop threshold Dth will be described below with reference to FIG. 5.

If the following expression can be established based on the relationship among the calculated communication delay time Tdc, the delay time Td in the radiation generation apparatus 110, and a nominal minimum irradiation time, it can be determined prior to imaging that the irradiation cannot be stopped at a desired timing due to an extremely large communication delay time. In this situation, for example, control processing to prohibit imaging is performed. Additionally or alternatively, for example, an operation to issue a warning to a user may be performed.

$$Tdc > (\text{nominal minimum irradiation time}) - Td$$

Since the communication delay time Tdc is a delay time in communication from the radiation imaging apparatus 120 to the irradiation control apparatus 130, the communication delay time Tdc includes a time for internal processing in units such as an access point, a hub, and a wireless relay. In addition, the communication delay time Tdc includes an application layer delay, a transmission delay, a propagation delay, a processing delay in a wireless management server (encryption processing etc.), and a delay time in using a plurality of hubs and the like. The communication delay time including these times is referred to as the communication delay time Tdc.

Figure 4:
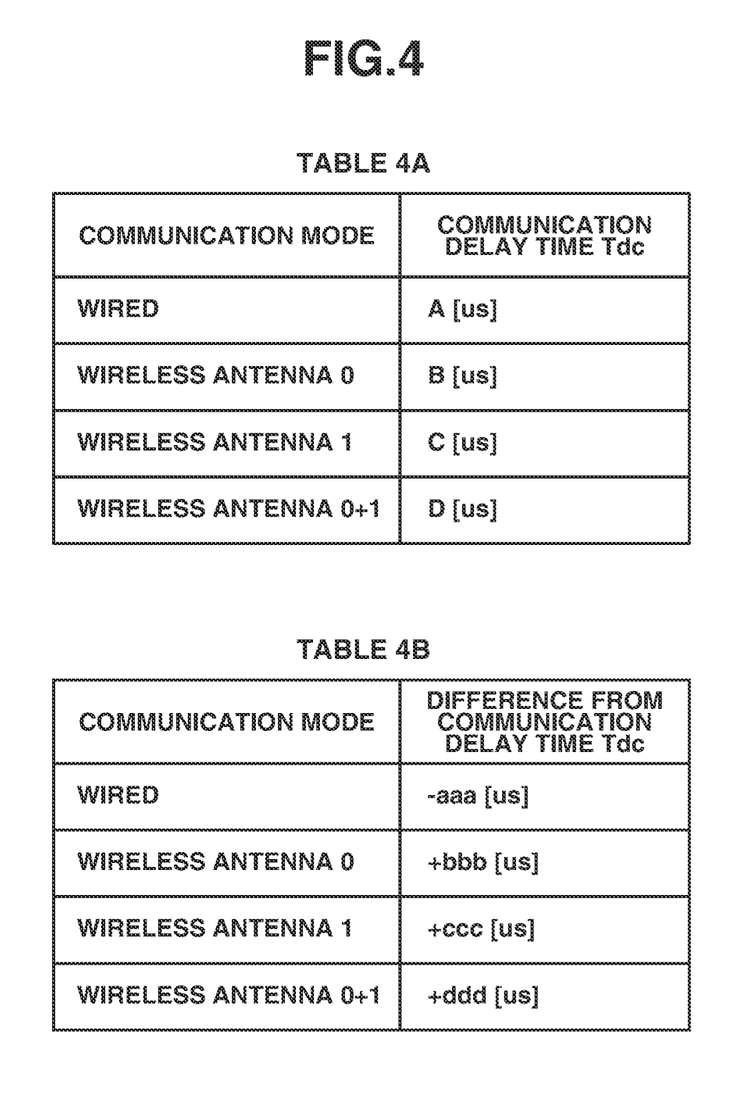
FIG. 4 is tables each illustrating a relationship between a communication mode and a communication delay time in the radiation imaging system according to the first exemplary embodiment.

The value of the communication delay time Tdc varies depending on the difference in the communication mode between the radiation imaging apparatus 120 and the irradiation control apparatus 130. Specifically, the value of the communication delay time Tdc varies depending on which one of wired communication and wireless communication is established. In a system in which a technique for improving the communication quality using a plurality of antennas in wireless communication is incorporated, the communication delay time Tdc varies depending on which one of the plurality of antennas is used. Depending on the difference between communication modes, different communication delay times Tdc are held in a table format in the threshold decision unit 124 as illustrated in FIG. 4.

The threshold decision unit 124 determines the communication mode between the communication unit 123 and the communication unit 133 at an imaging timing, and reflects the value of the communication delay time Tdc depending on the communication mode in the setting of the irradiation stop threshold using the table of the communication delay times Tdc.

For example, if a wired communication is disconnected and switched to a wireless communication immediately before imaging and the previously acquired delay time Tdc during the wired communication is reflected in the setting of the irradiation stop threshold, automatic exposure control (AEC) cannot be accurately performed. Accordingly, if the communication delay times Tdc corresponding to the respective communication modes are held in a table format as illustrated in FIG. 4, the accurate communication delay time Tdc depending on the communication mode set at the imaging timing can be reflected in the setting of the irradiation stop threshold, thereby making it possible to accurately perform AEC.

While Table 4A illustrates an example where the communication delay times Tdc corresponding to the respective communication modes are held in a table format, differences from a base communication delay time may be held in a table format as illustrated in Table 4B.

While FIG. 4 illustrates an example where two antennas for wireless communication are used, the number of antennas to be used is not particularly limited. Three or more antennas may be used, or only one antenna may be used.

Next, processing for setting the irradiation stop threshold Dth for the dose (cumulative dose) and the time variation of the irradiation stop threshold Dth in step S202 illustrated in FIG. 2 will be described with reference to FIG. 5. In the case of setting the time variation of the irradiation stop threshold Dth for the dose (cumulative dose), if it is determined that the radiation dose (cumulative dose) D is less than the irradiation stop threshold Dth (YES in step S204), the processing of step S202 is also performed.

Figure 5:
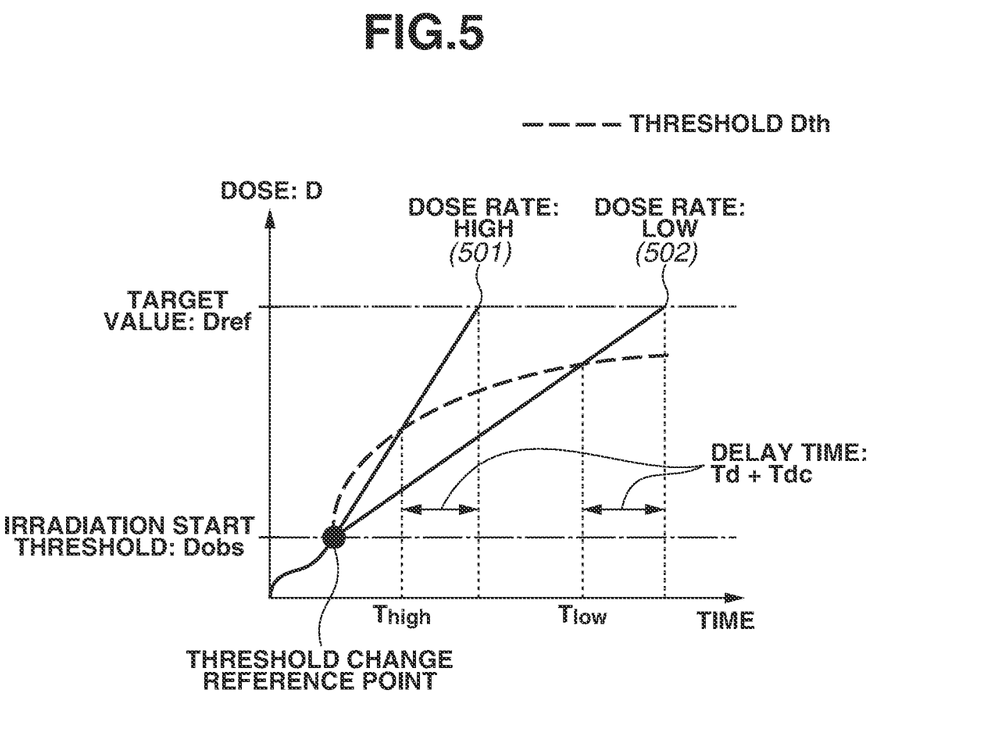
FIG. 5 is a graph illustrating an example of a relationship between a dose and a time variation of a threshold set by a threshold decision unit according to the first exemplary embodiment.

FIG. 5 illustrates an example of a relationship among the irradiation stop threshold Dth for the dose (cumulative dose), the time variation of the irradiation stop threshold Dth, and the radiation dose (cumulative dose) D according to the first exemplary embodiment. FIG. 5 illustrates the relationship between the radiation dose (cumulative dose) D represented by the vertical axis and time (elapsed time) represented by the horizontal axis.

As illustrated in FIG. 5, the threshold decision unit 124 performs control processing to change the irradiation stop threshold Dth for the dose (cumulative dose) depending on the elapsed time from start of irradiation of radiation. Specifically, as illustrated in FIG. 5, the threshold decision unit 124 performs control processing to increase the irradiation stop threshold Dth for the dose (cumulative dose) with elapsed time.

A starting point when the elapsed time is measured corresponds to the threshold change reference point illustrated in FIG. 5. As described above, when the threshold determination unit 122 determines that the radiation dose (cumulative dose) D detected by the sensor unit 121 has reached the irradiation start threshold held in the threshold determination unit 122, a notification about the time point when the radiation dose (cumulative dose) D reaches the irradiation start threshold is provided to the threshold decision unit 124 as the threshold change reference point.

The threshold decision unit 124 counts the elapsed time from the threshold change reference point, and performs control processing to change the irradiation stop threshold Dth for the dose (cumulative dose) depending on the elapsed time.

In the case of performing imaging, even when an irradiation start instruction is issued to the radiation generation apparatus 110 in the imaging control unit 131, it may take a longer rise time depending on the tube of the radiation generation apparatus 110 and the activation of the tube may be unstable. If the elapsed time is counted from the time when the irradiation start instruction is issued, the actual radiation dose (cumulative dose) D does not match the irradiation dose assumed based on the dose rate, which makes it difficult to accurately change the irradiation stop threshold Dth for the dose (cumulative dose). To avoid this, a timing when the irradiation starts to be stabilized is set as the threshold change reference point, thereby achieving an improvement in the accuracy of the irradiation stop control 136.

In the determination as to whether the radiation dose (cumulative dose) D detected by the sensor unit 121 has reached the irradiation start threshold when the threshold change reference point is set, the radiation dose (cumulative dose) D detected by the sensor unit 121 can be suitably used. In this case, if the signal-to-noise (S/N) ratio of the dose detected by the sensor unit 121 is sufficiently high, the determination as to whether the radiation dose (cumulative dose) D has reached the irradiation start threshold may be made using a sample dose instead of using the cumulative dose.

If the threshold determination unit 122 determines that the radiation dose (cumulative dose) D detected by the sensor unit 121 is more than or equal to the irradiation stop threshold Dth for the dose (cumulative dose) that varies with elapsed time illustrated in FIG. 5 (NO in step S204), the processing proceeds to step S205 in FIG. 2. In step S205, the irradiation stop signal 127 is transmitted to the irradiation control apparatus 130 and the imaging control unit 131 performs the irradiation stop control 136 to stop irradiation of radiation from the radiation generation apparatus 110.

In this case, the radiation is continuously irradiated by the amount corresponding to the communication delay time Tdc associated with the transmission of the irradiation stop signal 127 and the delay time Td from the time when the irradiation stop control 136 is performed to the time when irradiation of radiation in the radiation generation apparatus 110 is actually stopped.

In the example illustrated in FIG. 5, at a dose rate 501, which is a high dose rate of radiation entering the radiation imaging apparatus 120, the radiation dose (cumulative dose) D obtained by the dose calculation unit 126 is more than or equal to the irradiation stop threshold Dth for the dose (cumulative dose) at an irradiation time $T_{high}$. As a result, at the irradiation time $T_{high}$, the radiation imaging apparatus 120 transmits the irradiation stop signal 127 to the irradiation control apparatus 130. After that, irradiation of radiation in the radiation generation apparatus 110 is stopped.

In this case, the dose calculation unit 126 detects that the irradiation stop threshold Dth is exceeded, and the irradiation stop threshold Dth is determined by taking into consideration the communication delay time Tdc and the delay time Td in the radiation generation apparatus 110. Accordingly, when irradiation of radiation from the radiation generation apparatus 110 is actually stopped, the radiation of the target value Dref reaches the radiation imaging apparatus 120.

Similarly, at a dose rate 502, which is a low dose rate of radiation entering the radiation imaging apparatus 120, the radiation dose (cumulative dose) D obtained by the dose calculation unit 126 is more than or equal to the irradiation stop threshold Dth for the dose (cumulative dose) at an irradiation time $T_{low}$.

As a result, at the irradiation time $T_{low}$, the radiation imaging apparatus 120 transmits the irradiation stop signal 127 to the irradiation control apparatus 130. After that, irradiation of radiation in the radiation generation apparatus 110 is stopped. The dose calculation unit 126 detects that the irradiation stop threshold Dth is exceeded, and the irradiation stop threshold Dth is determined by taking into consideration the communication delay time Tdc and the delay time Td in the radiation generation apparatus 110. Accordingly, when irradiation of radiation from the radiation generation apparatus 110 is actually stopped, the radiation of the target value Dref reaches the radiation imaging apparatus 120.

As illustrated in FIG. 5, the dose rate 501 and the dose rate 502 of the radiation are determined based on the relationship between the radiation dose (cumulative dose) D and time. In the graph illustrated in FIG. 5, for example, if the irradiation stop threshold Dth for the dose (cumulative dose) is constant, the actual radiation dose (cumulative dose) D varies depending on a change in the dose rate. This may result in a irradiation time longer than a desired timing when irradiation is to be actually stopped. Thus, the value of the actual radiation dose (cumulative dose) D is apart from the target value Dref of the dose (cumulative dose), which causes excessive irradiation.

In the present exemplary embodiment, as illustrated in FIG. 5, control processing is performed to change the irradiation stop threshold Dth for the dose (cumulative dose) (specifically, increase the irradiation stop threshold Dth for the dose (cumulative dose) with elapsed time) depending on the elapsed time from start of irradiation of radiation. Accordingly, the value of the target value Dref of the dose (cumulative dose) can be obtained at each of the high dose rate 501 and the low dose rate 502. Consequently, control processing to stop irradiation of radiation can be accurately performed regardless of the dose rate.

In the present exemplary embodiment, as illustrated in FIG. 5, the time variation of the irradiation stop threshold Dth for the dose (cumulative dose) is sequentially changed with elapsed time. However, the time variation of the irradiation stop threshold Dth for the dose (cumulative dose) may be represented by a step function that varies stepwise with elapsed time, for example, in view of a memory capacity.

In this case, the length of each time segment for the step function associated with the irradiation stop threshold Dth for the dose (cumulative dose) may vary depending on the time segment.

In the present exemplary embodiment, the irradiation stop threshold Dth for the dose (cumulative dose) with respect to an elapsed time t can be set to satisfy the following Expression (1) using the elapsed time t, the delay time Td, the communication delay time Tdc, the irradiation start threshold Dobs, and the target value Dref of the dose (cumulative dose).

$$Dth(t) = \frac{t}{t + (Td + Tdc)}(Dref - Dobs) + Dobs \quad (1)$$

Specifically, as represented by Expression (1), the threshold decision unit 124 changes the irradiation stop threshold Dth for the dose (cumulative dose) depending on the elapsed time t. In addition, the threshold decision unit 124 sets the time variation of the irradiation stop threshold Dth for the dose (cumulative dose) based on the target value Dref of the dose (cumulative dose), the irradiation start threshold Dobs, the delay time Td, and the communication delay time Tdc.

In the case of using a step function as the irradiation stop threshold Dth for the dose (cumulative dose), it may be desirable to set a function such that Expression (1) and each step intersect.

According to this configuration, control processing to stop irradiation of radiation from the radiation generation apparatus 110 can be accurately performed. In other words, AEC can be accurately performed.

The exemplary embodiment described above illustrates an example where irradiation of radiation is stopped in a case where the cumulative dose reaches the irradiation stop threshold Dth. Alternatively, a time when the cumulative dose reaches the irradiation stop threshold Dth may be predicted based on the dose rate and irradiation of radiation may be stopped at the predicted time. The time may be predicted based on the dose rate a plurality of times until the cumulative dose reaches the irradiation stop threshold Dth, and the time when the cumulative dose reaches the irradiation stop threshold Dth may be updated in accordance with the change in the dose rate. Also, in this case, the irradiation time can be measured from the time point when the cumulative dose reaches the irradiation start threshold, thereby making it possible to accurately predict the timing for stopping irradiation of radiation.

According to the exemplary embodiment of the present invention, control processing to stop irradiation of radiation from the radiation generation apparatus can be accurately performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2021-180577, filed Nov. 4, 2021, and No. 2022-067120, filed Apr. 14, 2022, and No. 2022-169169, filed Oct. 21, 2022, which are hereby incorporated by reference herein in their entirety.

What is claimed is:

1. A radiation imaging apparatus comprising:
  a sensor configured to detect radiation from a radiation generation apparatus;
  a processor; and
  a memory storing a program which, when executed by the processor causes the radiation imaging apparatus to:
  transmit a signal for stopping irradiation of radiation to the radiation generation apparatus using a cumulative dose of the radiation detected by the sensor, an irradiation time for the radiation, an irradiation start threshold, and an irradiation stop threshold, wherein, after the cumulative dose reaches the irradiation start threshold which can be changed by an operator's operation, the signal for stopping irradiation of radiation is transmitted to the radiation generation apparatus based on the irradiation stop threshold obtained by using the irradiation time and the irradiation start threshold.

2. The radiation imaging apparatus according to claim 1, wherein measurement of the irradiation time is started when the cumulative dose reaches the irradiation start threshold.

3. The radiation imaging apparatus according to claim 2, wherein setting of the irradiation stop threshold is controlled based on a target value of the cumulative dose in radiation imaging, the irradiation time, and a delay time from transmission of the signal for stopping irradiation of the radiation to stopping of irradiation of the radiation in the radiation generation apparatus.

4. The radiation imaging apparatus according to claim 3, wherein the processor further causes the radiation imaging apparatus to transmit the signal for stopping irradiation of the radiation to the radiation generation apparatus,
wherein the delay time is derived based on the communication delay time in communication between the processor and the radiation generation apparatus.

5. The radiation imaging apparatus according to claim 4, wherein the delay time is derived based on the communication delay time in a communication mode for the radiation imaging among a plurality of communication modes.

6. The radiation imaging apparatus according to claim 4, wherein a plurality of the communication delay times is acquired before the radiation imaging is performed.

7. The radiation imaging apparatus according to claim 6, wherein the delay time is derived based on one of the plurality of communication delay times.

8. The radiation imaging apparatus according to claim 6, wherein the delay time is derived based on an average value of some or all of the plurality of communication delay times.

9. The radiation imaging apparatus according to claim 6, wherein the delay time is derived based on a minimum value of the plurality of communication delay times.

10. The radiation imaging apparatus according to claim 1, wherein in a case where no response is received from the radiation generation apparatus for a predetermined period in response to the transmission of the signal for stopping irradiation of the radiation, the signal for stopping irradiation of the radiation is retransmitted to the radiation generation apparatus.

11. The radiation imaging apparatus according to claim 1, wherein a timing of the transmission of the signal for stopping irradiation of the radiation is determined based on the irradiation time and an irradiation start threshold.

12. A radiation imaging system comprising:
a radiation imaging apparatus including a sensor configured to detect radiation from a radiation generation apparatus;
a processor;
a memory storing a program which, when executed by the processor causes the radiation imaging apparatus to:
transmit a signal for stopping irradiation of radiation to the radiation generation apparatus using a cumulative dose of the radiation detected by the sensor, an irradiation time for the radiation, and an irradiation time for the radiation, an irradiation start threshold, and an irradiation stop threshold,
wherein, after the cumulative dose reaches the irradiation start threshold which can be changed by operator's operation, the signal for stopping irradiation of radiation is transmitted to the radiation generation apparatus based on the irradiation stop threshold obtained by using the irradiation time and the irradiation start threshold; and
the radiation generation apparatus.

13. A control method for a radiation imaging apparatus, the control method comprising:
detecting radiation from a radiation generation apparatus by a sensor;
transmitting a signal for stopping irradiation of radiation to the radiation generation apparatus using a cumulative dose of the radiation detected by the sensor, an irradiation time for the radiation, an irradiation start threshold, and an irradiation stop threshold; and
after the cumulative dose reaches the irradiation start threshold which can be changed by an operator's operation, the signal for stopping irradiation of radiation is transmitted to the radiation generation apparatus based on the irradiation stop threshold obtained by using the irradiation time and the irradiation start threshold.

14. A storage medium storing a program for causing a computer to execute the control method according to claim 13.

15. The radiation imaging apparatus according to claim 1, wherein the irradiation start threshold is the cumulative dose in a stable state of irradiation from the radiation generation apparatus.

16. The radiation imaging apparatus according to claim 1, wherein setting of the irradiation stop threshold is controlled based on a target value of the cumulative dose in radiation imaging, the irradiation time, and a delay time, the delay time corresponding to a time when a tube voltage in a radiation tube has started to drop to a time when the tube voltage has dropped to a minimum voltage level.

* * * * *